(12) United States Patent
Bae

(10) Patent No.: US 6,728,116 B2
(45) Date of Patent: Apr. 27, 2004

(54) MAGNETIC CIRCUIT USING SWITCHING

(75) Inventor: Youn Soo Bae, Kyunggi-do (KR)

(73) Assignee: Enertec Korea Co., Ltd., Seoul (KR)

( * ) Notice: Subject to any disclaimer, the term of this patent is extended or adjusted under 35 U.S.C. 154(b) by 0 days.

(21) Appl. No.: 10/221,303

(22) PCT Filed: Mar. 28, 2001

(86) PCT No.: PCT/KR01/00497

§ 371 (c)(1),
(2), (4) Date: Sep. 10, 2002

(87) PCT Pub. No.: WO01/73925

PCT Pub. Date: Oct. 4, 2001

(65) Prior Publication Data

US 2003/0076694 A1 Apr. 24, 2003

(30) Foreign Application Priority Data

Mar. 29, 2000 (KR) .......................................... 2000-16211

(51) Int. Cl.[7] ............................................... H02M 3/335
(52) U.S. Cl. .......................................... 363/20; 363/131
(58) Field of Search ............................. 363/21.04, 21.1, 363/21.11, 21.12, 21.18, 20, 131, 16, 21.05, 21.13

(56) References Cited

U.S. PATENT DOCUMENTS

| 4,280,174 A | * | 7/1981 | Sonda ......................... 363/24 |
| 4,334,267 A | | 6/1982 | Miko .......................... 363/133 |
| 4,847,746 A | | 7/1989 | Rilly et al. ................... 363/132 |
| 6,268,587 B1 | * | 7/2001 | Kooken et al. ......... 219/130.32 |

FOREIGN PATENT DOCUMENTS

| KR | 838449 | 11/1983 |
| KR | 8811988 | 10/1988 |

* cited by examiner

Primary Examiner—Shawn Riley
(74) Attorney, Agent, or Firm—Ladas & Parry

(57) ABSTRACT

Disclosed is an electromagnetic circuit wherein coils are wound in a forward (clockwise) direction and in a reverse (counterclockwise) direction and semiconductor switches are mounted in front of the respective coils so that a non-induction line becomes a polarity-converting point of an alternating magnetic flux by controlling currents. Accordingly, a mechanical dynamic power of a high torque can be obtained by electrical energy.

1 Claim, 9 Drawing Sheets

MAGNETIC CIRCUIT USING SWITCHING

TECHNICAL FIELD

The present invention relates to a magnetic circuit of a core-type electromagnet, inclusive of electric motors, having coils wound around ferromagnetic substances or of a coreless electromagnet having only coils wound, and more particularly to an electric circuit and a magnetic circuit constructed with two or more electromagnet coils wherein one coil is wound clockwise (S direction) and the other coil is wound counterclockwise (Z direction) and for providing a one-direction direct-current series control method of using a phenomenon that magnetic polarities are changed according to winding directions as electric currents flow with controls of a semiconductor switching device or a superconductive switching device mounted in front of the coils wound in the respective directions and a method of inducing alternating magnetic flux.

BACKGROUND ART

An alternating magnetic flux induction method which has been used so far is a method of generating an alternating electromotive force in a sinusoidal waveform due to changes of flux linkage of an induced magnetic flux in an armature coil wherein the magnetic flux of a field system is alternately induced in the armature by rotating the field system mounted on a shaft due to mechanical power and the mechanical power is obtained by attractive and repulsive forces generated through alternate applications of voltages to both ends of coils wound in an electric motor or other magnetic circuit.

The voltage or the voltage-applying method obtained as above is referred to as alternate current (AC). A concrete description added to the above will be as follows by using a view of FIG. 1 for showing a circuit of a conventional transformer.

An alternating switching method is repeated wherein, in coils 2 and 3 wound around a core 1 of a ferromagnetic substance, a direct current (DC) voltage is applied to an input terminal 4 for a certain period of time in an "A" direction and then cut off, and just after the cutoff, the DC voltage is applied to an opposite input terminal 5 in a "B" direction. Therefore, an alternating electromotive force is generated from output terminals 6 and 7.

The voltage applications through the alternating switching method require a high voltage application to obtain a rotation force of a high torque since reactance, that is, a functional resistance (alternate current resistance), is generated due to collisions with currents flowing against a current flow direction in addition to a coil material resistance to interrupt electric current applications in a proportion of a frequency magnitude.

In a theoretical description, the impedance is divided into a material resistance R and a reactance X largely changing according to frequencies, and the reactance is divided into the inductive reactance and the capacitive reactance. Impedance Z may be expressed as a following formula when a material resistance R, inductance L, capacitance C are connected in series:

$$Z = R + jX = R + j(X_L - X_C) = R + j\left(wL - \frac{1}{wC}\right), \text{ and}$$

$$|Z| = \sqrt{R^2 + X^2} = \sqrt{R^2 + \left(wL - \frac{1}{wC}\right)^2} \text{ [ohm]}$$

In the above formula, if alternating magnetic flux may be induced without frequency changes, the reactance term jX is cancelled out, so there exists only the material resistance R.

However, a push-pull inverter showing in FIG. 2 as a conventional voltage-applying method can obtain an alternating electromagnetic force from the output terminal 3 by applying a DC voltage, but has difficulties in real-time switching controls of both terminals since currents flow into a coil connected to a left-side switch and a coil connected to a right-side switch by switches about a common ground coil to generate the alternating electromagnetic force, deteriorates energy efficiency since currents are cut off due to current collisions when both switches all turn on as well as a phase difference of voltage and current is generated due to a dead time, and generates a reactance of interrupting current flows due to a current flow inertia when the both switches mounted on both sides are abruptly turned on and off to obtain an alternating electromotive force.

A description is made in detail as follows through a view shown in FIG. 2.

As shown in FIG. 2a, if an S1 switch 24 turns on in the state that an S2 switch 25 turns off, a circuit is formed in which the positive voltage of a voltage source 23 is applied in a "C" direction from a common ground 26 to part of a coil 21 connected to the S1 switch, and to the negative voltage of the voltage source 23 along the S1 switch 24.

At this time, a current waveform 27 shown in FIG. 2b appears across an output coil 3, and, in reverse, if the S1 switch 24 turns off and the S2 switch 25 turns on, a circuit is formed in which the positive voltage of the DC voltage source 23 is applied from the common ground 26 to the part of the coil 22 connected to the S2 switch, and to the negative voltage of the voltage source 23 along the S2 switch 25, so a current waveform shown in FIG. 2b appears across the output coil 3.

When the above is repeated, an alternating electromotive force is generated across the output coil 3 by a mutual induction. When a description is made with a digital logic formula, the push-pull inverter may be interpreted as a combinational logic-type switch circuit of the Exclusive-OR (XOR) type.

However, such switching power input method, in case that it is applied to an electromagnet or a transformer using an iron core, a mutual induction appears to be distorted due to an instant saturation of a magnetic substance as well as electric currents are not conducted owing to current collision when all the switches turn on due to imbalance appearing between peak values of two switching currents caused by a switching time difference of the switches 24 and 25, and energy consumption increases due to a leakage inductance of a magnetic substance caused by the mutual induction and a hysteresis loss appearing upon interchanging N and S poles.

Particularly, since the method can be realized only a control method of a parallel structure, much more currents are required than a control method of a series structure upon applying currents at respective phases, an amount of electric power consumption increases a lot as an amount of heat release increases in proportion to the current amounts, and the heat becomes a cause of function deterioration.

Further, a method of driving an inverter of a two-phase hybrid electric motor of a two-power source type as shown in FIG. 3 has an object of rapidly increasing currents by applying a voltage over a rating voltage to the electric motor the instant inputs to the armature change due to the switch-on and switch-off of a switching transistor for rapid clockwise (CW) and counterclockwise (CCW) conversions.

That is, in a state that a voltage of 24 V is applied from a power source 31, it is structured that clockwise (CW) rotations are caused by turning on a transistor (TR1) 33-1 (when a transistor (TR2) 33-2 is turned off) with a transistor (TR3) 35-1 and a transistor (TR4) 35-2 alternately switching, and, in reverse, counterclockwise (CCW) rotations are caused by turning off the transistor (TR1) 33-1 in case that a transistor (TR5) 35-3 and a transistor (TR6) 35-4 are alternately switching.

The characteristics of this circuit increase response capability by rapidly increasing currents with support of 6.3 V of a power source 32 upon clockwise and counterclockwise conversions.

However, the driving circuit has a problem in that a high voltage is applied again as to a phase having been already operating with a low voltage, and can not maximize current efficiency since the circuit operates in a driving control method between phases based on a parallel-structured voltage input type.

In the meantime, FIG. 4a and FIG. 4b are views for showing an inverter circuit of a three-phase 180-degree conducting type electric motor and for explaining a method of obtaining a rotational magnetic field from sequential controls.

In FIG. 4a, if an S1 switch 42-1, an S5 switch 42-3, and an S4 switch 42-5 turn on in order to obtain a rotational magnetic field by switching a power source 41 as shown in a time sequence chart of FIG. 4b, a half of a voltage is applied along a V-phase coil 43-1 connected with $V_A$ node 45 and the rest of the voltage, that is, the remaining half of the voltage, is applied along a W-phase coil 43-3 connected with a $V_C$ node 47.

The voltages are combined at a neutral point 44 commonly grounded to flow to a negative terminal along an S4 switch 42-5 through a $V_B$ node 46 connected with a U-phase coil 43-2, so that an initial rotational magnetic field is generated.

Further, if the S5 switch 42-3 is turned off by a gate drive circuit not shown based on a next switching sequence (electrical angles from 60 degrees to 120 degrees) and the S1 switch 42-1, an S4 switch 42-5, and an S6 switch 42-6 are turned on, the voltage from the power source 41 is divided at the neutral point 44 commonly connected through the V-phase coil 43-1 connected with the $V_A$ node along the S1 switch 42-1, so an half of the voltage from the power source 41 is applied to the S4 switch 42-5 along the $V_B$ node 46 connected with an U-phase coil 43-2 to reach the negative terminal of the power source, and the remaining half of the voltage reaches an S6 switch 42-6 along the $V_C$ node 47 connected with the W-phase coil 43-3 and then returns to the negative terminal of the power source, to thereby cause a second-stage rotational magnetic field.

The switching is repeated according to the sequence order shown in FIG. 4b, so that a rotational power is obtained.

However, the driving method causes collisions between the voltages while changing the flows of the voltages as the half of the voltage passes the W-phase coil 43-3 connected via the S5 switch 42-3 already turned on and the $V_C$ node 47 and the neutral point 44 commonly connected to the respective phases in order to obtain a first stage (electrical angles between 0 degree to 60 degrees in the time sequence chart) rotational magnetic field and the S6 switch 42-6 is turned on while the S5 switch 42-3 is turned off, abruptly, in order to obtain a voltage returning to the negative terminal along the S4 switch 42-5 via the $V_B$ node connected with the U-phase coil 43-2 and the second-stage (electrical angles between 60 degrees to 120 degrees in the time sequence chart).

That is, if the S5 switch (42-3) is turn off and the S6 switch 42-6 is turned on, the voltage reaches the neutral point commonly connected with the respective phases along the V-phase coil 43-1 connected via the S1 switch 42-1 and the $V_A$ node 45, and the voltage reached at the neutral point is divided into a half of it. In the first stage, the half of the voltage is applied to the U-phase coil 43-2 in a direction that the voltage progresses, and the remaining half of the voltage is applied to the W-phase coil 43-3 in a reverse direction that the voltage progresses in the first stage to collide with the voltage progressed by the first stage switching, so that the collision becomes a factor of interrupting the flow of currents. In order to reduce the interruption, switching is made with a dead time upon switching, which prevents only damages to devices but can not prevent a functional resistance of obstructing the generation of a phase difference of the voltage and current and the flow of currents.

Accordingly, this causes a voltage to increase when in a high-speed rotation.

FIG. 4b is a sequence chart for controlling angles and real-time switching of an inverter circuit of an electric motor used in a conventional art, which is shown for explaining a dead time 50.

In the sequence chart, when changing into a U+phase 48 and a U+phase 49, that is, when changing polarities between positive and negative in respective phases, the dead time 50 is required due to collisions with a reverse electromotive force, and it is determined whether driving is stable and devices are destructed by a condition of the required dead time.

Accordingly, an inverter structure of such driving method is a combinational logic switching circuit and has difficulties in series driving, and does not take reactance due to frequency conversions into consideration, only changing a brush-type electric motor into an electronic type in driving.

DISCLOSURE OF THE INVENTION

The present invention has been devised to solve the above problem, so it is an object of the present invention to reduce reactance by controlling to obtain dynamic forces and eletromotive force with alternate magnetic flux induced even though currents flow only in one direction (direct current, in series) by constructing plural coils having different winding directions or more coils in a single, three-phase, and multiple-phase.

It is another object of the present invention to provide a ternary electric power signal by applying voltages to a magnetic circuit with an OR-type combinational logic switching circuit.

It is a further object of the present invention to reduce a magnetic hysteresis loss by ascending and descending a magnetic flux density (B) value with a reference of a non-induction point in a magnetic circuit using a ferromagnetic material.

It is another further object of the present invention to provide a new pole-converting point by direct current (DC) characteristics appearing when switched in order for a positive voltage and a negative voltage to be applied only in one direction to coils wound in different directions by using different magnetic hysteresis curves appearing according to winding directions.

It is a still another further object of the present invention to maximize the efficiency of electric currents with a construction of a phase-series driving circuit.

In order to achieve the above objects, by one characteristic of the present invention, an electromagnetic circuit combining an electric circuit and a magnetic circuit has a switching control unit as a magnetic circuit and an OR-type combinational logic switching control circuit for controlling respective phases in series and direct current, and an alternating magnetic flux induction unit for inducingalternating magnetic flux in an m-waveform type of DC characteristics applied by a manner that switches are alternately turned on and the switches are simultaneously turned on at pole-converting point newly appearing about a non-induction line or non-induction point).

In the switching control unit, one coil of a magnetic circuit is wound clockwise (S direction) and the other coil is wound counterclockwise (Z direction). If a semiconductor switch or a superconductive switch mounted in front of the coil wound clockwise (S direction) is turned on (the semiconductor switch is turned off), the positive voltage of a direct current (DC) voltage source flows to a diode or a device for preventing a reverse bias which is connected to the end of the coil along the S-direction coil and then returns to the negative terminal of the DC voltage source, to thereby induce a magnetic flux of N pole in the magnetic circuit. If the semiconductor switch or the superconductive switch mounted in front of the Z-direction coil is turned on (the other semiconductor switch or the superconductive switch is turned off), the positive voltage of the DC voltage source flows to a diode or a device for preventing a reverse bias which is connected to the end of the coil along the Z-direction coil and then returns to the negative terminal of the DC voltage source, to thereby induce a magnetic flux of S pole. If the semiconductor switches or superconductive switches in front of the S-direction and Z-direction coils are simultaneously turned on, voltages are applied in both directions so that a non-induction occurs in the coils and a neutral zone appears. The same amount of DC current as the input current returns to the negative terminal of the DC voltage source at a common connection node connected with output terminals of the diodes or devices for preventing a reverse bias which are mounted behind the coils.

In the alternating magnetic flux induction unit, the semiconductor switch or superconductive switch connected to the S-direction coil out of the coils wound in reverse to each other is turned on (the semiconductor switch for the Z-direction coil is turned off) to apply a voltage, current increases in the positive direction from a neutral line during the turn-on time by a desired amount, and, after the increase up to the desired amount, is maintained parallel with the time coordinate. At this time, if the semiconductor switches or superconductive switches connected in front of the S-direction and Z-direction coils are all turned on, the current in the S-direction coil drops to a half of it and a half of the current flows in the Z-direction coil so that no induction occurs in a magnetic substance in the coils. At this state, if the semiconductor switch or superconductive switch connected in front of S-direction coil is turned off, the current in the Z-direction coil increases. By repeating the switching as above, voltage-applying curves of the S-direction and Z-direction coils are formed over or below a neutral line of DC characteristics differently from alternate current (AC) waveforms, so that the non-induction point or non-induction line appears about a point of a half of the applied voltage.

BRIEF DESCRIPTION OF THE DRAWINGS

The above objects and other advantages of the present invention will become more apparent by describing in detail a preferred embodiment thereof with reference to the attached drawings, in which:

FIG. 6b is a view for showing voltage-applying switching times for a switching circuit of FIG. 6a;

BEST MODE FOR CARRYING OUT THE INVENTION

Hereinafter, the operations of the embodiments according to the present invention will be described as follows together with structures thereof.

Figure 5:
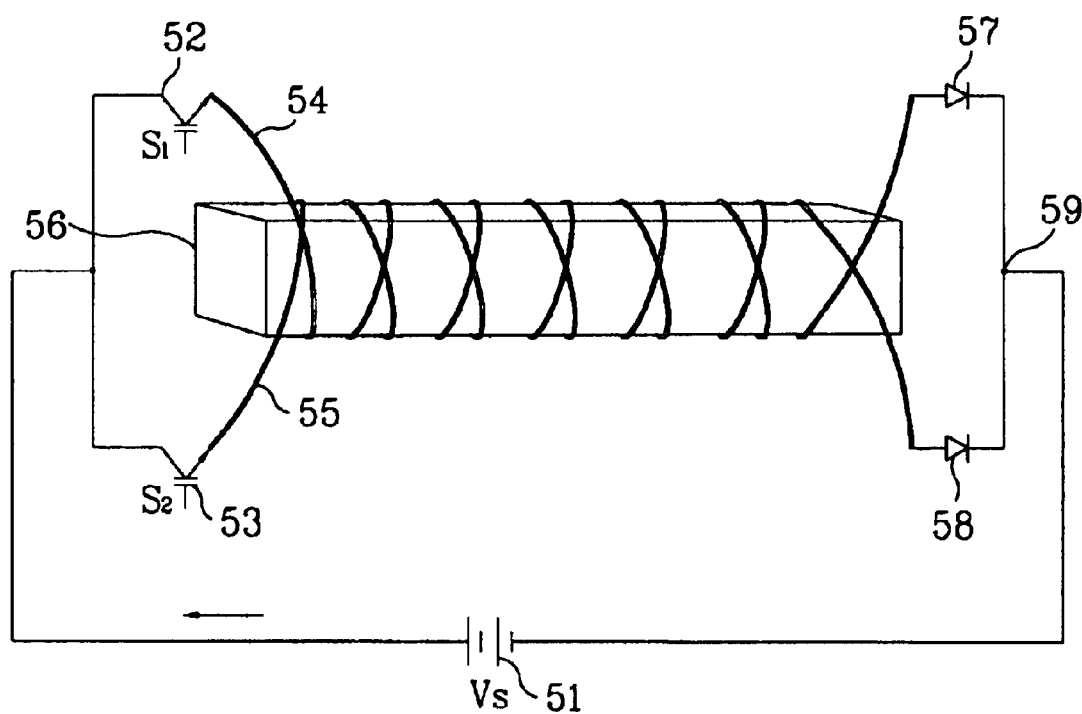
FIG. 5 is a perspective view for showing a structure of magnetic circuit windings and switches according to an embodiment of the present invention.

FIG. 5 is a perspective view for showing a structure of magnetic circuit windings and switches according to an embodiment of the present invention, and, in a state that a voltage from a voltage source Vs 51 is applied to a magnetic circuit constructed with coils wound on a ferromagnetic conductor 56 (core-type) or only coils 54 and 55 (coreless type), if an S1 switch 52 is turned on and an S2 switch 53 is turned off, currents flow into the coil 54 in one direction (in the clockwise direction), so that a magnetic flux of S pole is induced in the conductor 56.

In reverse, if the S1 switch 52 is turned off and the S2 switch 53 is turned on, currents flow into the coil 55 in another S direction (in the counterclockwise direction), so that a magnetic flux of N pole is induced in the conductor 56. If the S1 switch 52 and the S2 switch 53 are all turned on, a magnetic flux in the magnetic circuit 56 is not induced by the coils 54 and 55 having different winding directions, the currents causing the magnetic flux to be induced return to the voltage source 51 via a common connection node 59 formed by connecting leads of diodes 57 and 58 or devices for preventing reverse biases.

In such a structure, the voltage is applied only in a direct current characteristic direction despite the induction of the alternating magnetic flux, which is a method of applying currents by alternate switching at both ends of coils (coils wound with one or plural wires) in a group. The method has an advantage in that an energy loss is greatly reduced due to a less hysteresis loss except for reactance since it has less electrical collisions and magnetic hysteresis in the coils than a method of inducing an alternating magnetic flux.

Further, such a structure according to an embodiment of the present invention will be described as follows.

Figure 6A:
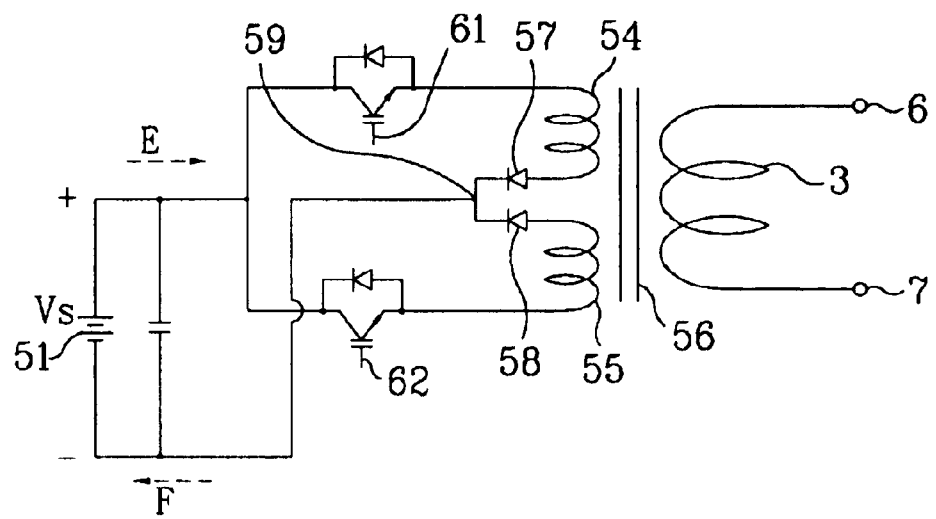
FIG. 6a is a view for showing a switching circuit according to another embodiment of the present invention.
Figure 6B:
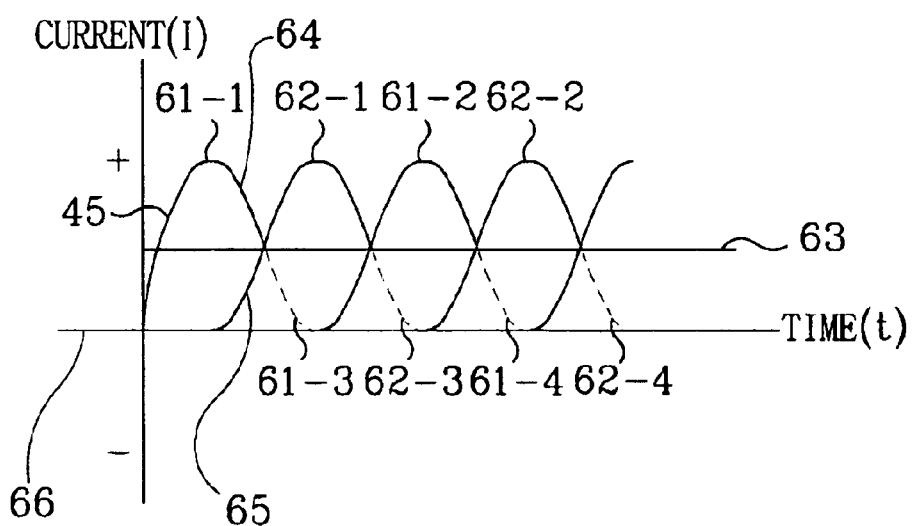

As shown in FIG. 6a and FIG. 6b, if a voltage is applied as in a voltage-applying curve 61-1 of FIG. 6b by turning on an S1 switch 61 and turning off an S2 switch 62 with a gate drive circuit controlled by a sequence not shown in a state that the voltage from a voltage source 51 is applied in an "E" direction, the voltage returns to the voltage source 51 in a "F" direction along a diode 57 or a device for preventing a reverse bias via the coil 54 wound clockwise and connected to the S1 switch 61 to induce a magnetic flux of N pole, and, if the S1 switch 61 and the S2 switch 62 are all turned on, a half of the voltage flowing to the S1 switch 61 drops as in a voltage-dropping curve 64 of FIG. 6b with a reference of a new voltage-applying change line 63 of FIG. 6b, a half of the voltage rises as in a voltage-rising curve 65 of FIG. 6b in the S2 switch 62 of FIG. 6a, and the voltages return to the voltage source 51 in a "F" direction along the diodes 57 and 58 or the devices for preventing a reverse bias via the coil 54 wound clockwise and the coil 55 wound counterclockwise in FIG. 6a, to thereby induce non-induction magnetic flux.

If only the S1 switch 61 is turned off and the S2 switch 62 continues to be turned on in FIG. 6a, a voltage applied as in a voltage-applying curve 62-1 for the S2 switch in FIG. 6b returns to the voltage source 51 in the "F" direction along the diode 57 for preventing a reverse bias via the coil 55 wound counterclockwise, to thereby obtain a magnetic flux of S pole.

The magnetic flux obtained from the above is induced in an iron core 56 and an alternating electromotive force is generated by the alternating magnetic flux in the secondary coil 3.

FIG. 6b is a view for showing a voltage-applying curve on a switching basis, the X-coordinate indicates time (t) changes and the Y-coordinate indicates changes of current increases and decreases. As shown in the graph, a method for supplying voltages according to an embodiment of the present invention shows a method for inducing alternating magnetic flux based on an application of voltages of a m-type waveform with a reference of the voltage-applying change line 63 newly formed on the upper part of the neutral line 66 rather than an alternating voltage-applying method with a reference of the neutral line 66 of a voltage supply.

That is, a new inverting method is presented to obtain alternating magnetic flux as the voltage-applying curve 61-1 of FIG. 6b based on the S1 switch 61 of FIG. 6a and the voltage-applying curve 62-1 of FIG. 6b based on the S2 switch 62 of FIG. 6a continue to turn on and off the respective switches according to a sequence order with a reference of the voltage-applying change line 63 (magnetic flux non-induction line).

Figure 6C:
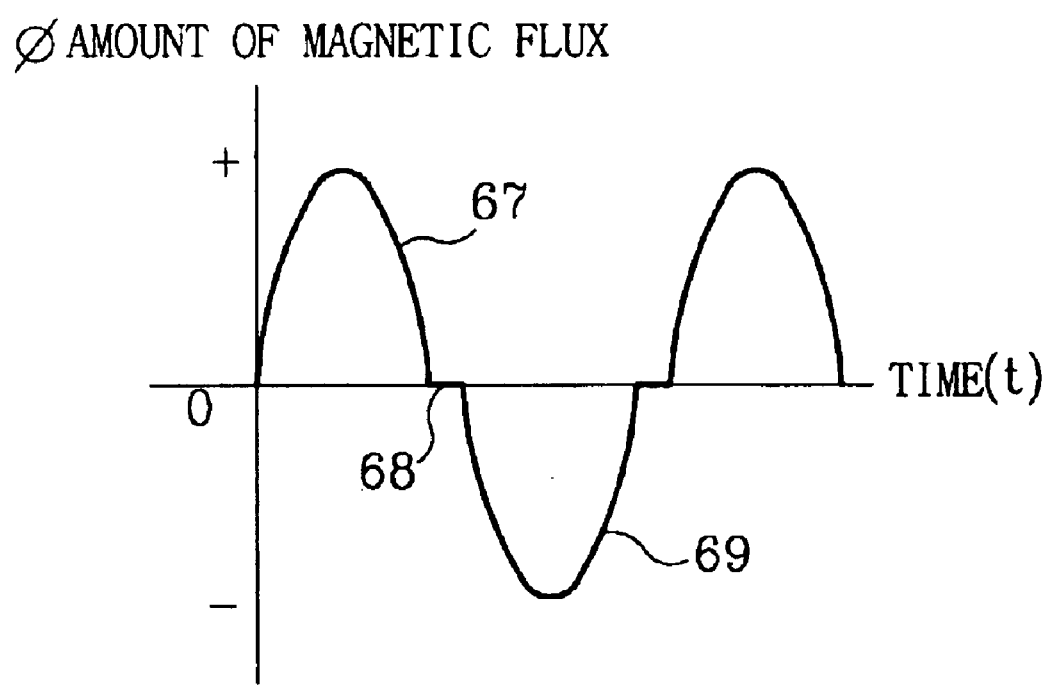
FIG. 6c is a view for showing magnetic flux waveforms according to another embodiment of the present invention.

Three 64, 65, and 66 or more output magnetic flux waveforms presented by controlling a voltage-applying switching method in FIG. 6c are used for alternating electromotive forces of a transformer for increasing and decreasing voltages or signal generators, and can be used as a heat generator based on induction heating in case of adding a magnetic circuit causing eddy currents and a high-frequency switching control unit as another use.

Figure 7A:
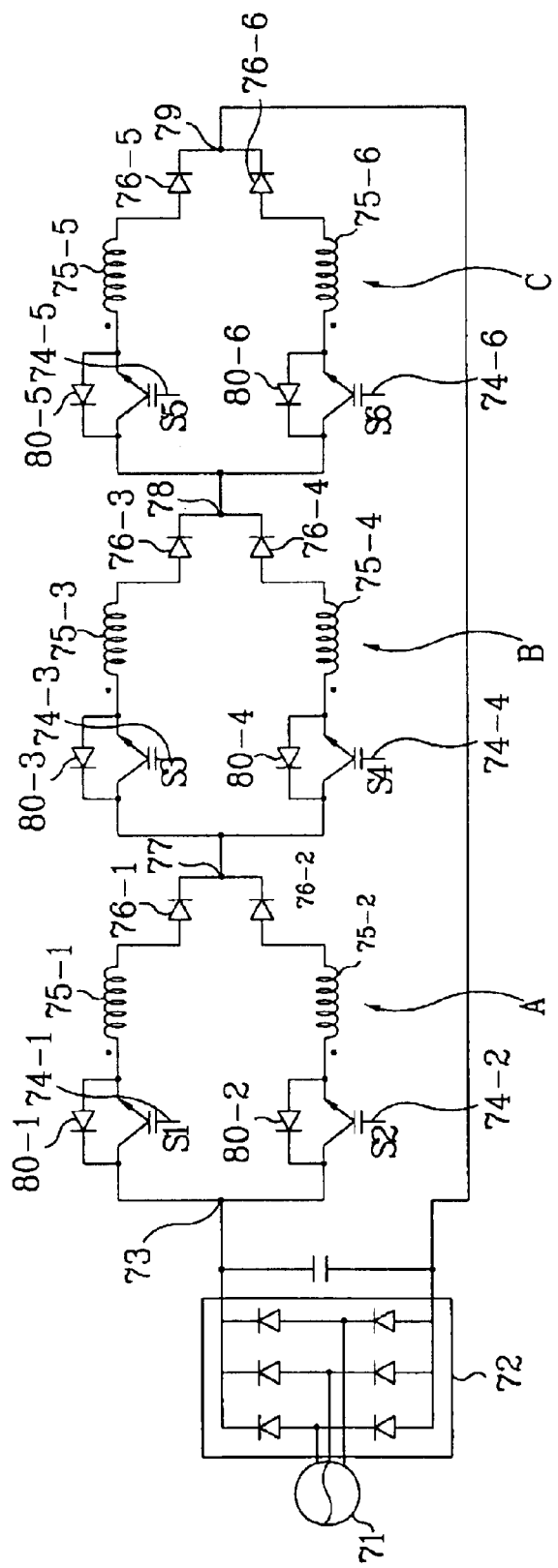
FIG. 7a is a view for showing a switching circuit according to a further embodiment of the present invention.

FIG. 7a is a view for showing a three-phase inverter circuit of an electric motor according to another embodiment of the present invention, in which a circuit is constructed in order for voltages to reach switches along a voltage-distributing connection node by rectifying voltages of an alternate current (AC) voltage source 71 in a voltage direct current (DC) rectification unit 72 into DC voltages, and, if switches S1, S2, and S3 are turned on and the switches S2, S4, and S6 are turned off by controlling the switches with a gate drive circuit, a magnetic flux of N pole is induced in coils 75-1, 75-3, 75-5 of a magnetic circuit. In the meantime, if the switches S1, S2, and S3 are turned off and the switches S2, S4, and S6 are turned on, a magnetic flux of S pole is induced in coils 75-2, 75-4, and 75-6 of the magnetic circuit.

Further, if the switches S1, S3, and S5 and the switches S2, S4, S6 are all turned on, no magnetic flux is induced in the coils 75-1, 75-3, 75-5, 75-2, 75-4, and 75-6 of the magnetic circuit despite the applications of the voltages.

Since magnetic flux changes occur on a basis of a non-induction pole change line, the present invention provides an inverter circuit constructed to generate mechanical power based on induction of an alternating magnetic flux according to a switching voltage-applying method of a direct current/series rail type distinct from a conventional method of causing magnetic flux changes with a reference of an alternate current neutral line.

Figure 7B:
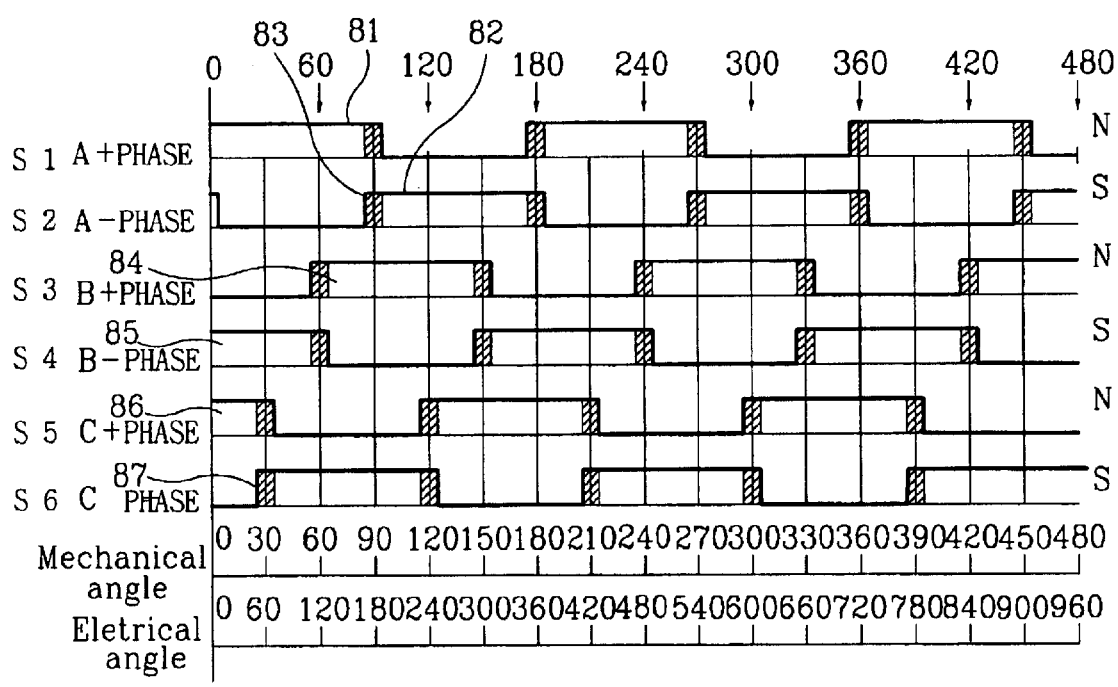
FIG. 7b is a view for showing sequences according to a further embodiment of the present invention.

FIG. 7b is a sequence time chart for a 4-pole 3-phase control of an electric motor according to another embodiment of the present invention. Another embodiment of the present invention will be described in detail as follows by using FIG. 7a and FIG. 7b.

In FIG. 7a, if a voltage from the alternate current voltage source 71 is rectified into a DC voltage in the voltage DC rectification unit 72 and the rectified DC voltage reaches the switches along the voltage-distributing connection node 73, the S1 switch 74-1 shown in FIG. 7a is applied according to a sequence order of FIG. 7b, in the pulse amplitude modulation (PAM), or pulse width modulation (PWM), and a combinational manner of the PAM and PWM during 0 degree to 94 degrees as in an A+phase voltage-applying sequence of FIG. 7b.

In the above method, if a voltage of a B-phase of FIG. 7b is applied in relation to the S4 switch 74-4 of FIG. 7a during 0 degree to 64 degrees (85) and a voltage of a C+phase of FIG. 7b is applied in relation to the S5 switch 74-5 of FIG. 7a during 0 degree to 34 degrees (86), the currents in the coils connected to the switch terminals of the respective phases return to the voltage source 71 via a diode 76-5 or a device for preventing reverse bias as to the respective phases after inducing a magnetic flux in a magnetic circuit consisting of ferromagnetic substances to cause initial driving, and then, if a voltage of an A-phase of FIG. 7b is applied in relation to the S2 switch 74-2 of FIG. 7a during 86 degrees to 184 degrees (82), a voltage of an B+phase of FIG. 7b is applied in relation to the S3 switch 74-3 of FIG. 7a during 56 degrees to 154 degrees (84), and a voltage of a C−phase of FIG. 7b is applied in relation to the S3 switch 74-6 of FIG. 7a during 26 degrees to 124 degrees (87), currents of the coils connected to the switch terminals of the respective phases induces a magnetic flux in the magnetic circuit consisting of ferromagnetic substances, return to the voltage source 71 via a diode 76-6 or a device for preventing reverse bias as to the C−phase, to thereby continue driving.

Figure 1:
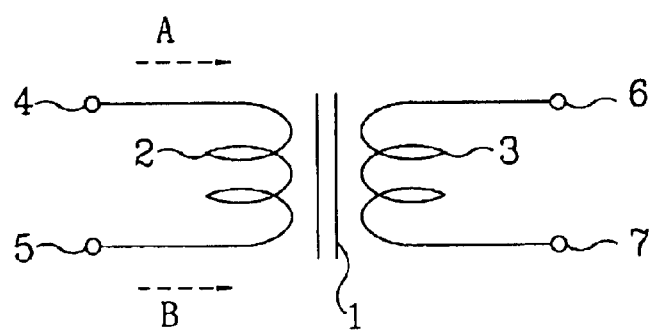
FIG. 1 is a view for showing a conventional electrical circuit of inducing alternating magnetic flux.
Figure 1:
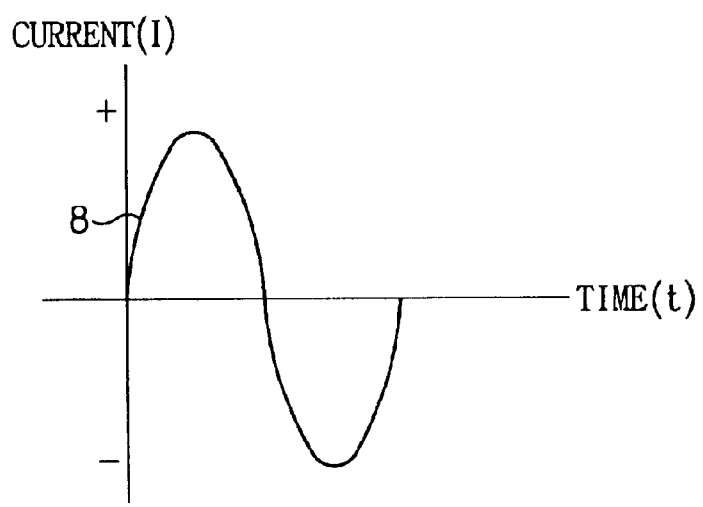
Figure 1:
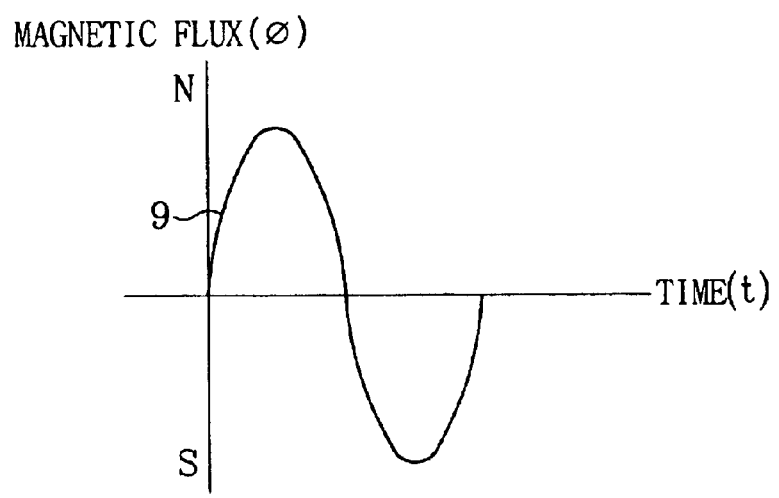
Figure 2A:
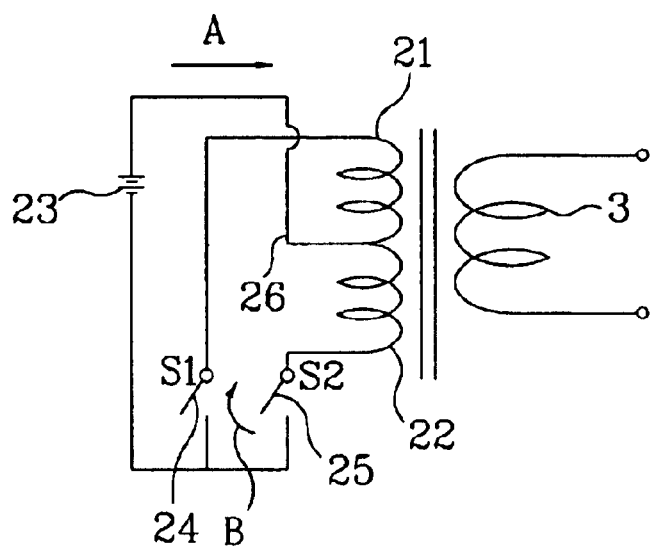
FIG. 2a is a view for showing a structure of a conventional push-pull inverter.
Figure 2B:
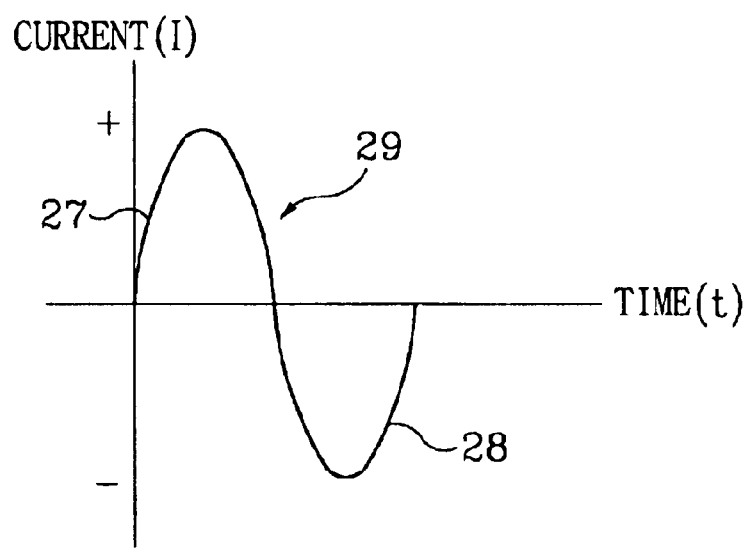
FIG. 2b is a view for showing an output waveform of a conventional push-pull inverter.
Figure 3:
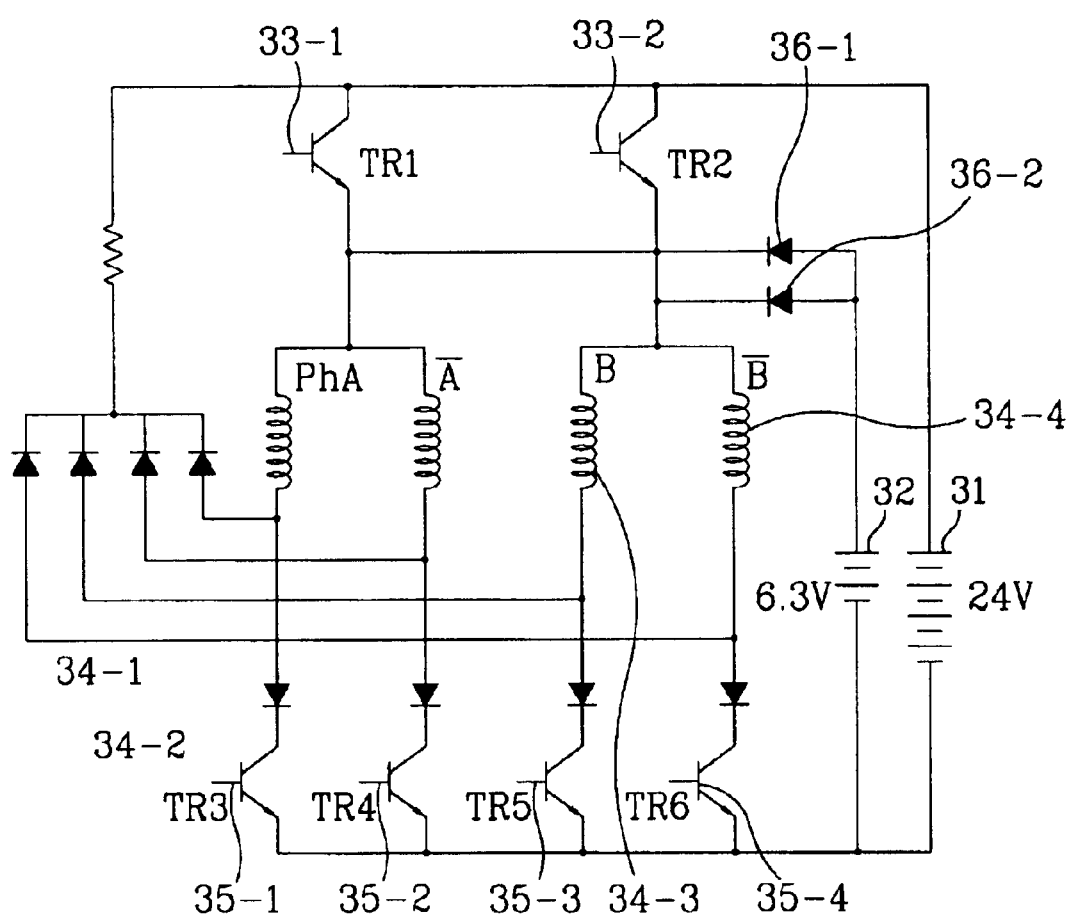
FIG. 3 is a view for showing a structure of an inverter circuit for a conventional two-phase hybrid electric motor of a two-power source type.
Figure 4A:
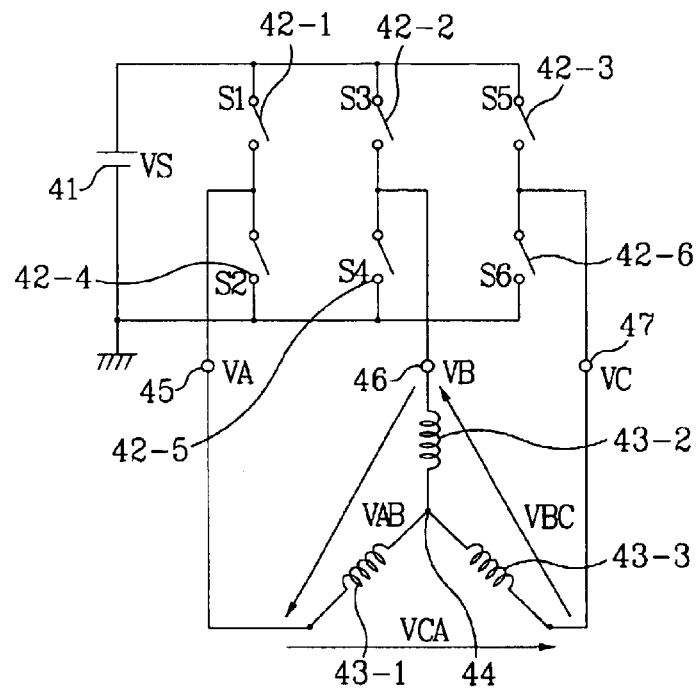
FIG. 4a is a view for showing a structure of an inverter circuit for a conventional electric motor.
Figure 4B:
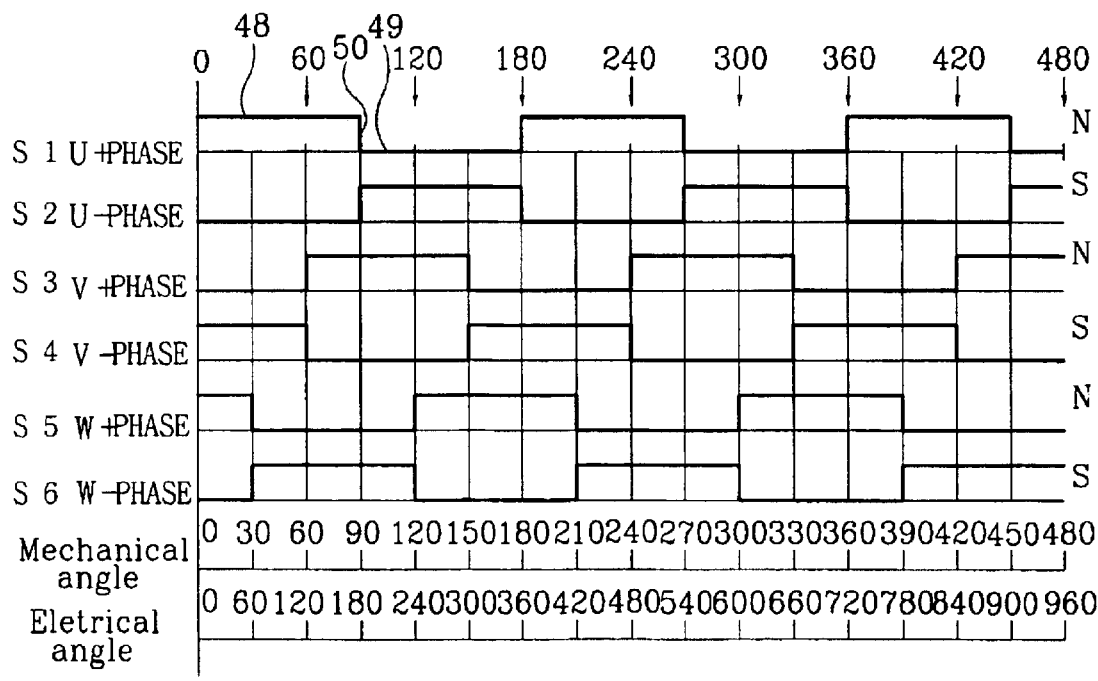
FIG. 4b is a sequence time chart of an inverter circuit for a conventional is electric motor.

In the meantime, a conventional 4-pole motor presented in FIG. 4b has a mechanical angle and an electrical angle of 180 degrees with a reference of 90 degrees in view of a sequence control structure, but, since an actual voltage input is achieved a few degrees ahead of a reference angle (0°, 90°, 180°, and 270° in a 180° in a conducting type, and 0°, 120°, and 240° in a 120° conducting type) under consideration of the dead time as well as a voltage is inputted a few degrees behind of the reference angle due to a reverse electromotive force upon a next switching operation for polarity changes, so that the application of the voltage is cut off as long as a period of the dead time to generate a phase difference between voltages and currents. In order to overcome this, a voltage source efficiency must be enhanced by using a power-factor compensation circuit and the like.

However, in the embodiment of the present invention as shown in FIG. 7b, 4 degrees before and after a mechanical angle of 90° and an electrical angle of 180 are increased (a non-induction angle can be changed based on a design criteria).

That is, a switch is turned off after a voltage is applied a few degrees longer than a sequence reference angle, in a sequence time chart of an A+phase voltage application, upon changing voltages for a polarity conversion in FIG. 7b, and, upon applying an A−phase voltage for a next polarity conversion, a switch is turned on a few degrees ahead of the sequence reference angle, which generates a voltage-overlap application region 83 between the A+phase and A−phase.

The region is a non-induction zone (a new voltage application change line 63), and, as shown in FIG. 6b, a voltage-application curve 61 is formed with a reference of this zone.

Accordingly, the voltage-applying method according to an embodiment of the present invention, as a polarity-converting voltage-applying method of a direct current rail type, does not generate a phase difference between a voltage and a current since a voltage is not cut off during operations, induces alternating magnetic flux by operating two or more switches in an m-waveform voltage-applying method as shown in FIG. 6b based on a DC voltage source about a voltage-applying converting line on a non-induction line formed over or below the neutral line rather than in an alternating magnetic flux induction method based on an AC voltage application about the neutral line, but is distinguished from a conventional inverter-driving method in that no impedance due to an electric field differently from an alternating magnetic flux induction method due to a frequency conversion as a voltage-applying method of DC characteristics rather than of AC characteristics.

INDUSTRIAL APPLICABILIY

A circuit structured according to the present invention has effects as below through a few embodiments.

Since crossing points of magnetic poles exist on a non-induction line newly presented in the present invention and alternating magnetic flux can be induced not by an AC unit but by a DC unit in order to obtain an attractive force and repulsive force of the magnetic flux, reactance occurring by frequencies can be greatly reduced to conduct a high current at a low voltage, and, in particular, since a non-induction point in an electric motor has an advantage in that it can reduce vibration due to polarity changes and an iron loss due to magnetic hysteresis of a ferromagnetic substance and a voltage-applying method of the DC characteristics has no phase difference between a voltage and a current, an energy loss due to the phase difference (power-factor) can be reduced.

Further, since the voltage-applying method by a switching unit of the present invention enables a series circuit to be constructed, the present invention has a great effect of maximizing a current efficiency compared to a parallel circuit.

What is claimed is:

1. A magnetic circuit in which one coil is wound clockwise (S-direction) and the other coil is wound in counter-clockwise (Z-direction) and switches mounted in a pre-stage of the respective coils are turned on and off based on a sequence order, comprising:

a switching control means of an inverter or a converter for performing direct current (DC)/series multiple phase controls based on OR-type combinational logic switching controls of the respective phases wherein the inverter or converter circuit is constructed to induce an N-pole magnetic flux, an S-pole magnetic flux, or non-induction as a DC voltage returns to a negative terminal of its voltage source via reverse-bias prevention devices connected to ends of the coils along one or the other coil; and an alternating magnetic flux inducing unit for inducing alternating magnetic flux in an m-waveform type of DC characteristics applied by a manner that switches are alternately turned on and the switches are simultaneously turned on at pole-converting point newly appearing about a non-induction line or non-induction point wherein the non-induction line or non-induction point is formed at a half point of an applied voltage at an upper or lower portion of a neutral zone if the switches are alternately turned on or the switches are all turned on according to the sequence order about a polarity-converting point.

* * * * *